US012801507B2

(12) United States Patent
Mandal et al.

(10) Patent No.: US 12,801,507 B2
(45) **Date of Patent: *Nov. 17, 2026**

(54) SYSTEMS, METHODS, APPARATUSES, AND COMPUTER PROGRAMS FOR GENERATING AN ALERT CLUSTER LIST INTERFACE CONFIGURED TO EXECUTE BULK ACTIONS

(71) Applicant: ATLASSIAN PTY LTD., Sydney (AU)

(72) Inventors: Atri Mandal, Bengaluru (IN); Mayank Sawhney, Bengaluru (IN); Jason D. Cruz, Melbourne (AU)

(73) Assignee: ATLASSIAN PTY LTD., Sydney (AU)

( * ) Notice: Subject to any disclaimer, the term of this patent is extended or adjusted under 35 U.S.C. 154(b) by 51 days.

This patent is subject to a terminal disclaimer.

(21) Appl. No.: 18/395,916

(22) Filed: Dec. 26, 2023

(65) Prior Publication Data

US 2025/0208969 A1 Jun. 26, 2025

(51) Int. Cl.

*G06F 11/32* (2006.01)
*G06F 11/07* (2006.01)

(52) U.S. Cl.

CPC ........ *G06F 11/327* (2013.01); *G06F 11/0709* (2013.01); *G06F 11/0781* (2013.01)

(58) Field of Classification Search

CPC ............. G06F 11/0709; G06F 11/0781; G06F 11/0793; G06F 11/3072; G06F 11/3082; G06F 11/327; G06F 11/366

See application file for complete search history.

(56) References Cited

U.S. PATENT DOCUMENTS

| | | | | |
|---|---|---|---|---|
| 10,505,825 | B1 * | 12/2019 | Bettaiah | G06F 16/24578 |
| 11,281,521 | B1 | 3/2022 | Petkar | |
| 2005/0010416 | A1 * | 1/2005 | Anderson | G16H 40/63 704/271 |
| 2009/0150812 | A1 * | 6/2009 | Baker | G16H 40/63 715/764 |
| 2010/0162269 | A1 * | 6/2010 | Lucas | G06F 11/3495 719/318 |
| 2013/0007655 | A1 * | 1/2013 | Bridgen | G06F 3/048 715/790 |
| 2014/0304553 | A1 * | 10/2014 | Gondi | G06F 11/301 714/39 |

(Continued)

OTHER PUBLICATIONS

Wikipedia, "Unsupervised Learning", 2023, pp. 1-6. (Year: 2023).*

(Continued)

*Primary Examiner* — Gabriel Chu
(74) *Attorney, Agent, or Firm* — Alston & Bird LLP

(57) ABSTRACT

Various embodiments disclosed herein are directed to a system, method, apparatus, and/or a computer program product that are configured to create an alert cluster list interface for viewing alert clusters (rather than individual alerts) in an alert management system. The alert clusters presented via the alert cluster list interface are programmatically classified as similar or related using an alert clustering model as discussed herein. By providing the alert cluster list interface, various embodiments provide an automated and consolidated view of the alert landscape presented at any given time within a software application framework.

20 Claims, 6 Drawing Sheets

(56) References Cited

U.S. PATENT DOCUMENTS

| | | | | |
|---|---|---|---|---|
| 2014/0325364 | A1* | 10/2014 | Tee | G06F 11/0751 715/736 |
| 2021/0089377 | A1* | 3/2021 | Wang | G06F 11/0793 |
| 2021/0279603 | A1 | 9/2021 | Teran et al. | |
| 2021/0406041 | A1 | 12/2021 | Saraiya et al. | |
| 2023/0137235 | A1 | 5/2023 | Chen | |
| 2023/0262081 | A1 | 8/2023 | Malamut et al. | |
| 2024/0340314 | A1 | 10/2024 | Radon et al. | |
| 2025/0045140 | A1 | 2/2025 | Tzur et al. | |

OTHER PUBLICATIONS

Bagherjeiran et al., Adaptive Clustering: Better Representatives with Reinforcement Learning, Mar. 18, 2005, University of Houston, Dept of Computer Science.

Bagherjeiran et al., Adaptive Clustering: Obtaining Better Clusters Using Feedback and Past Experience (Dec. 2005), University of Houston, Dept of Computer Science.

Non-Final Rejection Mailed on May 1, 2026 for U.S. Appl. No. 19/249,687, 32 page(s).

Final Rejection Mailed on Sep. 15, 2026 for U.S. Appl. No. 19/249,687, 37 page(s).

Non-Final Rejection Mailed on Aug. 28, 2026 for U.S. Appl. No. 19/249,510, 46 page(s).

* cited by examiner

SYSTEMS, METHODS, APPARATUSES, AND COMPUTER PROGRAMS FOR GENERATING AN ALERT CLUSTER LIST INTERFACE CONFIGURED TO EXECUTE BULK ACTIONS

TECHNICAL FIELD

The present disclosure relates generally to alert management. In particular, it relates to systems that are configured to generate and manage alerts in software management platforms.

BACKGROUND

Alert management is an essential aspect of software development and IT service management in a software application framework. Applicant has identified a number of technical problems associated with alert management tools. Through applied effort, ingenuity, and innovation, Applicant has solved problems relating to alert management by developing solutions embodied in the present disclosure, which are described in detail below.

SUMMARY

In one embodiment, an alert cluster generation apparatus comprises one or more processors and one or more memories storing instructions that are operable, when executed by the one or more processors, to cause the alert cluster generation apparatus to: access an alert set associated with one or more service events; apply a feature extraction model that is configured to extract alert features from the alert set; apply an alert clustering model to group alerts of the alert set into one or more alert clusters based at least in part on the alert features; and cause rendering of an alert cluster list interface to a user device display, wherein the alert cluster list interface comprises an alert cluster engagement component associated with at least one of the one or more alert clusters.

In one embodiment, the alert cluster list interface comprises an alert cluster bulk action component associated with at least one of the one or more alert clusters. A bulk action assistant module is configured to cause rendering of the alert cluster bulk action component to the user device display in association with the one or more alert clusters. The alert cluster generation apparatus may be further configured to cause common action to each alert of the one or more alert clusters in response to user engagement with the alert cluster bulk action component.

In some embodiments, the alert cluster generation apparatus may be configured to cause rendering of an alert cluster detail interface associated with the at least one of the one or more alert clusters upon receiving a user engagement indication associated the alert cluster engagement component. The alert cluster detail interface comprises an alert cluster pattern interface component that is configured to visually depict alert analytics associated with the at least one of the one or more alert clusters.

In still other embodiments, the alert cluster generation apparatus further comprises an alert reranking module configured to rank alerts of the alert set into a ranked sequence based at least in part on the alert features. The alert reranking module is further configured to rank alerts of the alert set into an updated ranked sequence based at least in part on the one or more alert features and alert feedback received from an alert manager device.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF SOME EXAMPLE EMBODIMENTS

Figure 1:
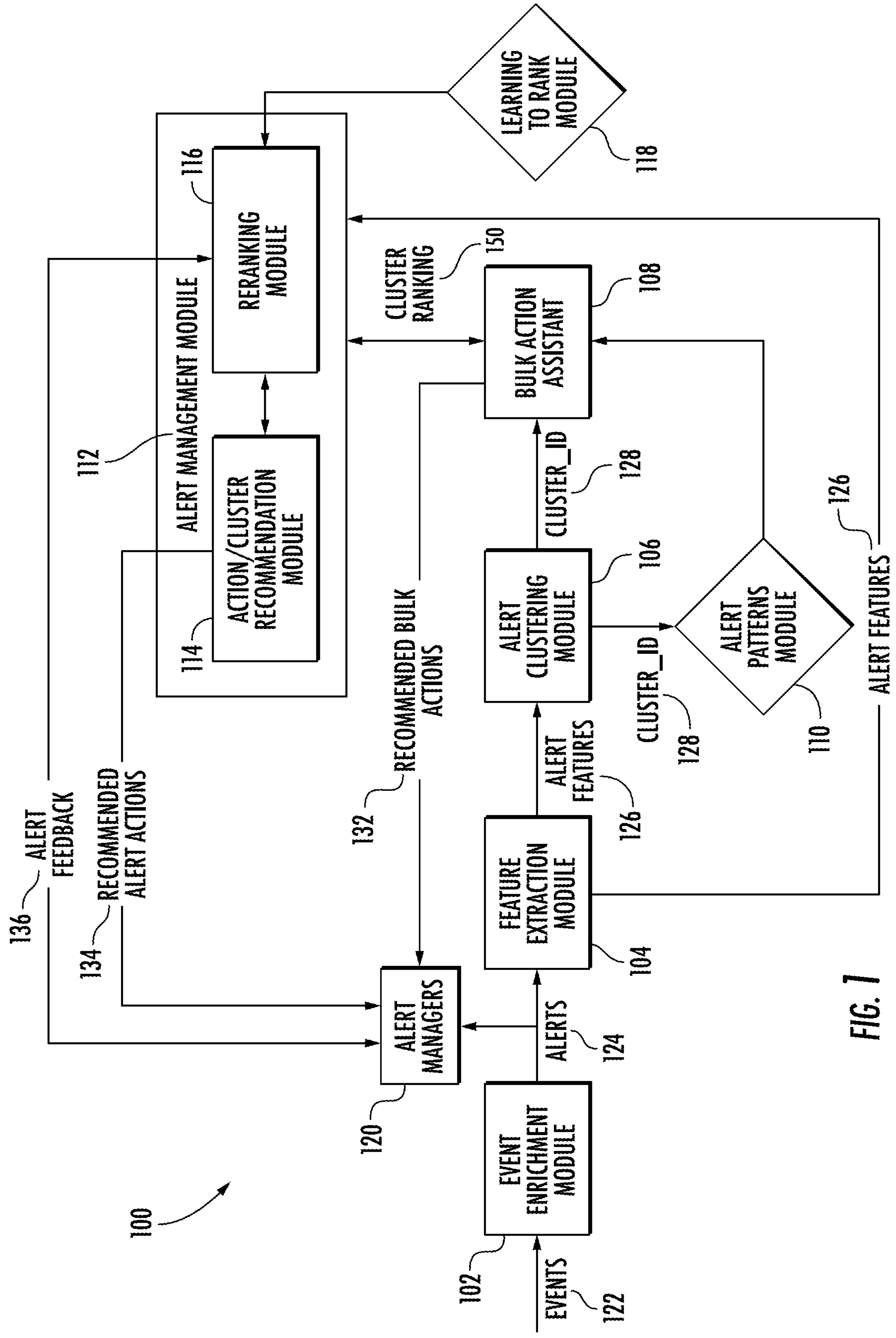
FIG. 1 shows a schematic view of an example data architecture for an example alert cluster generation system configured in accordance with various embodiments of the present disclosure.

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily refer to the same embodiment).

Overview

Alert management is an essential aspect of running a successful software application framework. Alert management systems are configured to provide and facilitate alert management in software application frameworks. However, many alert management systems are perhaps too good at their primary job of generating alerts in association with events of the software application framework. Such alert management systems generate huge volumes of alerts that must be reviewed and disposed of by alert managers. Alert overload may be particularly acute in service-orientated platforms as large numbers of alerts might be triggered by each service or microservice of the service-oriented platform. Alert overload may produce alert fatigue that may in turn lead to errors and potential service outages.

According to various embodiments, there is provided a system, method, apparatus, and/or a computer program that is configured to create an alert cluster list interface for viewing alert clusters (rather than individual alerts) in an alert management system (e.g., JSM, Opsgenie). The alert clusters presented via the alert cluster list interface are programmatically classified as similar or related using an alert clustering model as discussed herein. By providing the alert cluster list interface, various embodiments provide a consolidated view of the alert landscape presented at any given time within a software application framework. This consolidated view, and the related user interfaces discussed herein, are configured to reduce the potential for error that arises from alert overload.

In various embodiments, example alert cluster list interfaces are further configured to include an alert cluster engagement component associated with each alert cluster listed in the alert cluster list interface. The alert cluster engagement component is engageable by a user (e.g., an alert manager) to select a common or bulk action for execution in association with each alert of the respective alert cluster. For example, an alert manager may be enabled to dismiss or close fifteen alerts at once in circumstances where such alerts have been classified by the alert management system as belonging to a single alert cluster. Alternatively, an alert manager may be enabled to escalate simultaneously three alerts of an alert cluster for immediate review by a selected development operations team with a single mouse click.

In various embodiments, individual alert actions or bulk actions taken with respect to alert clusters are used in a feedback loop to train and optimize alert classification/clustering. Such alert actions or bulk actions may also be used to improve alert and cluster action recommendation operations discussed herein.

User engagement with example alert cluster list interfaces discussed herein may cause rendering of an alert cluster detail interface. The alert cluster detail interface may include an alert cluster pattern interface component that is configured to visually depict alert analytics and/or patterns associated with one or more alerts of an alert cluster. Example alert cluster detail interfaces also include a ranked list of alerts that have been classified to an alert cluster wherein the ranked list is ordered based on importance, urgency, similarity, likelihood of effective common action, and the like.

Definitions

The term "software application framework," refers to a software platform comprising one or more types of software applications (e.g., a monolithic platform and/or a service-oriented platform), which are described in more detail below. A software application framework may be a distributed framework wherein the one or more types of software applications (e.g., monolithic platforms and/or service-oriented platforms) may be configured to interface, integrate, transfer data, and/or otherwise communicate with one another via a respective communications network.

The terms "monolithic platform," or "monolithic software platform," refer to a software application designed to embody a single-tiered architecture in which the front end and back end systems are combined into a single platform. Monolithic software platforms are self-contained in that they can perform each operation needed to complete their intended purpose or function. Such example monolithic platforms may include Micros™ by Atlassian® platform or DynamoDB® by Amazon®.

The term "service-oriented platform" refers to a software application designed to embody a modular programming architecture based on specific service types, wherein the modular programming may comprise existing services combined by user specification in order to create a custom software application. In some embodiments, the services within the modular programming may configure a graphic user interface for user interaction with each service in an individual manner without affecting other services within the service-oriented platform. A service-oriented platform is typically characterized by large networks of interdependent services and microservices that support a myriad of software features and applications. Indeed, some large service-oriented platforms may be comprised of topologies of 1,500 or more interdependent services and microservices. Such service-oriented platforms are nimble, highly configurable, and enable robust collaboration and communication between users at individual levels, team levels, and enterprise levels.

Service-oriented platforms typically include large numbers of software applications. Each software application includes a number of features, with many features (e.g., user authentication features) shared between multiple software applications. Other features are supported only by one associated software application or a defined subset of software applications.

A given service-oriented platform could support hundreds of software applications and hundreds of thousands of features. Those applications and features could be supported by thousands of services and microservices that exist in vast and ever-changing interdependent layers. Adding to this complexity is the fact that at any given time, a great number of software development teams may be constantly, yet unexpectedly, releasing code updates that change various software services, launch new software services, change existing features of existing software applications, add new software applications, add new features to existing software applications, and/or the like.

The term "alert management system" refers to the software service that is configured to monitor a software application framework (e.g., associated with a monolithic software platform and/or a service-oriented platform) and may be deployed via a combination of computer hardware and/or software associated with a respective software application framework monitoring system. The alert management system is configured to detect alerts, cautions, problems, errors, issues, and/or incidents associated with the software application framework. Alert management systems are configured to mitigate excessive alert volumes in a software application framework such that the one or more services, applications, features, tools, and/or products associated with the software application framework are not adversely impacted (e.g., are not impacted by bandwidth and/or resource limitations caused by high alert traffic and/or excessive alert escalation). An example alert monitoring management system is Opsgenie® or Jira Service Management (JSM)® by Atlassian®.

Alert management systems may be configured to generate and/or receive large volumes of alerts (e.g., an alert set) related to the one or more respective cautions, problems, errors, issues, flags, vulnerabilities, and/or incidents associated with the software application framework. Alert management systems may also be configured to generate one or more alert notifications related to the one or more respective alerts, cautions, problems, errors, issues, and/or incidents. Such alert notifications are transmitted to user devices for rendering to an alert management system user interface.

Various alert management system embodiments include an event enrichment module, a feature extraction module, an alert clustering module, a bulk action assistant module, an alert patterns module, a learning to rank module, an alert management module, an action recommendation module, and a reranking module, which are each defined below. The alert management system receives inputs in the form of events. The alert management system is then configured to extract from those events the alerts and features of those alerts (i.e., alert features), and outputs recommended actions (by means of the alert management module) to one or more alert managers for addressing the alerts. The alert management system also groups the alerts into one or more alert clusters and causes rendering of an alert cluster list interface to a user device display.

The term "event enrichment module" refers to a program, service, or microservice that is configured to receive one or more events from a software application framework and generate (as outputs) one or more alerts that are associated with the one or more events. These alerts indicate potential issues with the software application framework and can be associated with incidents or correspond to actions that should be taken to address any potential issues. The event enrichment module outputs the alerts to a feature extraction module and also, in some embodiments, passes the alerts onto one or more alert managers.

The term "feature extraction module" refers to a program, service, or microservice that is configured to apply a feature extraction model to alerts (e.g., alert sets) to extract one or more alert features. Extracted alert features may include, but are not limited to, a region identifier associated with a geographic region where the alert occurred, a service identifier associated with an alert, a metric-value, an error code, a priority status, an alert text description or message, and/or an error category label. Once extracted, the alert features are sent to the alert management module and the alert matching module.

The term "alert clustering module" refers to a program, service, or microservice configured to apply an alert clustering model to group alerts into one or more alert clusters based on the alert features extracted by the feature extraction module. That is, alerts with similar alert features are clustered together by the alert clustering model of the alert clustering module. Each alert cluster identified by the alert clustering module is assigned an alert cluster identifier (e.g., cluster_ID). Alerts may be grouped by the alert clustering model based on a variety of features, including time, region, service identifier, error code, priority status, alert text description or message, error category label, historical response action, service dependency, and/or the like. Cluster identifiers may be appended to alerts (e.g., alert data objects) as metadata and output to a bulk action assistant.

In various embodiments, the alert clustering module is configured to output an alert cluster list interface to a user device display (e.g., an alert manager user device). The alert cluster list interface includes one or more alert cluster engagement components associated with one or more alert clusters. The alert cluster engagement component is an interface selector, button, drop-down interface, or other interface component that is engageable by a user (e.g., an alert manager) to select alert clusters for detailed inspection via an alert cluster detail interface.

The term "bulk action assistant" refers to a program, service, or microservice configured to parse alert clusters identified by the alert clustering module and identify common actions that may be executed in connection with each alert of the respective alert clusters. The bulk action assistant is configured to cause rendering of an alert cluster list interface to display of a user display of an alert manager. In various embodiments, the bulk action assistant is further configured to cause rendering of an alert cluster bulk action component to the user display in association with respective alert clusters presented in the alert cluster list interface. The alert bulk action component is an interface drop-down selector, button, or other interface component that is engageable by a user (e.g., an alert manager) to select a common action for execution in association with each alert of the respective alert cluster.

The term "alert patterns module" refers to a program, service, or microservice configured to apply an alert patterns model to alerts and alert clusters to identify patterns, analytics, and predicted or recommended actions for such alert clusters. The alert patterns module is configured to output its patterns, analytics, and predicted or recommended actions to the bulk action assistant.

The term "alert management module" refers to a program, service, or microservice that is configured to receive alerts, alert features, and alert clusters and to output recommended alert actions and to produce cluster rankings that are used to generate recommended cluster actions. In some embodiments, the alert management module comprises an action/cluster recommendation module and a reranking module. The action recommendation/cluster recommendation module is configured to receive, as inputs, one or more alerts, alert features, and alert clusters (i.e., alert sets that are flagged with cluster_IDs by the alert clustering module) and to output recommended alert actions and alert cluster rankings that may be used to generate recommended cluster actions. The action/cluster recommendation module provides recommended alert and cluster actions to alert managers to reduce the cognitive load required to handle multiple alerts. The reranking module accepts real-time alert feedback from actions taken by alert managers on alerts and alert clusters and uses such alert feedback to shape ongoing alert/cluster recommendations/rankings.

The term "learning to rank module" refers to a program, service, or microservice that is configured to accept historical alert data, historical alert action data, historical alert cluster data, historical alert cluster action data, historical alert root cause data, and the like, from a historical alert/cluster database to train, update, and optimize the algorithms and models employed by the action/cluster recommendation module and the reranking module of the alert management module. In some embodiments, the learning to rank model may be configured to also accept historical incident data and/or historical incident root cause data for training, updating, or optimizing algorithms and models employed by the action/cluster recommendation module and the reranking module of the alert management module. The learning to rank module employs one or more machine learning models, deep neural network algorithms, or other artificial intelligence techniques.

The term "alert managers" refers to client devices operated by individuals who receive the one or more alerts and take one or more actions with respect to the one or more alerts. That is, alert managers are tasked with handling and addressing the one or more alerts using alert cluster list interfaces. The alert managers receive and provide feedback on the alerts. The alert managers receive data and instructions from the bulk action assistant that are sufficient to cause rendering of an alert cluster list interface. The alert managers also receive recommended alert/cluster actions from the alert management module and the bulk action assistant that are sufficient for rendering alert cluster engagement components in association with respective alert clusters shown in the alert cluster list interface.

The term "events" refers to one or more activities that occur in a software application framework that trigger one or more alerts from an alert management system.

The term "alerts" refers to one or more cautions, problems, errors, issues, flags, and/or incidents that are generated by an alert management system that is configured to monitor a software application framework. Alerts are embodied as any data construct and/or data object generated by an alert management system indicating the status and/or operating functionality of a component, module, service, microservice, feature, application, and/or device within a software application framework. Such operating functionality may include indicators regarding the performance of a component (e.g., whether the component and its functions are running at peak speed or slower than peak speed, if certain functions or capabilities are not running at peak performance or not running at all, etc.). Further, operating functionality may include security threats (e.g., unauthorized access, data breaches, etc.), compliance issues (e.g., violation of data privacy), system failures (e.g., application crash, server down, network connection lost, etc.). Alerts may include alert attributes that are extracted as alert features as defined herein.

The term "alert features" refers to any data object, detail, attribute, embedding transformation, or the like that is extracted from an alert or alert set by a feature extraction model for use by one or more machine learning models (e.g., an alert clustering model). Such alert features may include embedding or vector transformations of text (e.g., alert message components, problem descriptions, etc.), software identifiers, service or microservice identifiers, and other data or metadata that are configured for input into a machine learning model such as an alert clustering model.

The term "cluster_ID" refers to a unique identifier such as a number or alphanumeric string of characters that are generated by an alert clustering module to identify an alert cluster. Cluster_IDs are output to a bulk action assistant and, in some embodiments, to an alert patterns module.

The terms "client device", "computing device", "user device", and the like may be used interchangeably to refer to computer hardware that is configured (either physically or by the execution of software) to access one or more of an application, service, or repository made available by a server (e.g., apparatus of the present disclosure) and, among various other functions, is configured to directly, or indirectly, transmit and receive data. The server is often (but not always) on another computer system, in which case the client device accesses the service by way of a network. Example client devices include, without limitation, smart phones, tablet computers, laptop computers, wearable devices (e.g., integrated within watches or smartwatches, eyewear, helmets, hats, clothing, earpieces with wireless connectivity, and the like), personal computers, desktop computers, enterprise computers, the like, and any other computing devices known to one skilled in the art in light of the present disclosure.

The terms "data," "content," "digital content," "digital content object," "signal," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media.

Examples of non-transitory computer-readable media include a magnetic computer readable medium (e.g., a floppy disk, hard disk, magnetic tape, any other magnetic medium), an optical computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use computer-readable storage medium, other types of computer-readable mediums can be substituted for or used in addition to the computer-readable storage medium in alternative embodiments.

The terms "application," "software application," "app," "product," "service" or other similar terms refer to a computer program or group of computer programs designed to perform coordinated functions, tasks, or activities for the benefit of a user or group of users. A software application can run on a server or group of servers (e.g., physical or virtual servers in a cloud-based computing environment). In certain embodiments, an application is designed for use by and interaction with one or more local, networked or remote computing devices, such as, but not limited to, client devices. Non-limiting examples of an application comprise project management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

The terms "machine learning module," "machine learning model," "ML module(s)," or "ML model(s)" refer to a machine learning or deep learning task or mechanism. The term "machine learning" refers to a method used to devise complex models and algorithms that lend themselves to prediction. A machine learning model is a computer-implemented algorithm that may learn from data with or without relying on rules-based programming. These models enable reliable, repeatable decisions and results and uncovering of hidden insights through machine-based learning from historical relationships and trends in the data. In some embodiments, the machine learning model is a clustering model, a regression model, a neural network, a random forest, a decision tree model, a classification model, or the like.

A machine learning model is initially fit or trained on a training dataset (e.g., a set of examples used to fit the parameters of the model). The model may be trained on the training dataset using supervised or unsupervised learning. The model is run with the training dataset and produces a result, which is then compared with a target, for each input vector in the training dataset. Based on the result of the comparison and the specific learning algorithm being used, the parameters of the model are adjusted.

The machine learning models as described herein may make use of multiple ML engines (e.g., for analysis, transformation, and other needs). The system may train different ML models for different needs and different ML-based engines. The system may generate new models (based on the gathered training data) and may evaluate their performance against the existing models. Training data may include any of the gathered information, as well as information on actions performed based on the various recommendations.

The ML models may be any suitable model for the task or activity implemented by each ML-based engine. Machine learning models may be some form of neural network. The underlying ML models may be learning models (supervised or unsupervised). As examples, such algorithms may be prediction (e.g., linear regression) algorithms, classification (e.g., decision trees) algorithms, time-series forecasting (e.g., regression-based) algorithms, association algorithms, clustering algorithms (e.g., K-means clustering, Gaussian mixture models, DBscan), or Bayesian methods (e.g., Naïve Bayes, Bayesian model averaging, Bayesian adaptive trials), image to image models (e.g., FCN, PSPNet, U-Net) sequence to sequence models (e.g., RNNs, LSTMs, BERT, Autoencoders) or Generative models (e.g., GANs).

The ML models may implement statistical algorithms, such as dimensionality reduction, hypothesis testing, one-way analysis of variance (ANOVA) testing, principal component analysis, conjoint analysis, neural networks, support vector machines, decision trees (including random forest methods), ensemble methods, and other techniques. Other ML models may be generative models (such as Generative Adversarial Networks or auto-encoders).

In various embodiments, the ML models may undergo a training or learning phase before they are released into a production or runtime phase or may begin operation with models from existing systems or models. During a training or learning phase, the ML models may be tuned to focus on specific variables, to reduce error margins, or to otherwise optimize their performance. The ML models may initially receive input from a wide variety of data, such as the gathered data described herein. The ML models herein may undergo a second or multiple subsequent training phases for retraining the models.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The terms "illustrative," "example," "exemplary" and the like are used herein to mean "serving as an example, instance, or illustration" with no indication of quality level. Any implementation described herein as "exemplary" is not necessarily to be construed as preferred or advantageous over other implementations.

The phrases "in one embodiment," "according to one embodiment," and the like generally mean that the particular feature, structure, or characteristic following the phrase may be included in the at least one embodiment of the present invention and may be included in more than one embodiment of the present invention (importantly, such phrases do not necessarily refer to the same embodiment).

The terms "about," "approximately," or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The term "plurality" refers to two or more items.

The term "set" refers to a collection of one or more items.

The term "or" is used herein in both the alternative and conjunctive sense, unless otherwise indicated.

Having set forth a series of definitions called-upon throughout this application, an example system architecture and example apparatus is described below for implementing example embodiments and features of the present disclosure.

Example System Architectures for Alert Management Systems

Methods, apparatuses, and computer program products of the present disclosure may be embodied by any of a variety of devices. For example, the method, apparatus, and computer program product of an example embodiment may be embodied by a networked device (e.g., an enterprise platform, service-oriented platform, and/or software application framework, etc.), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, virtual reality device, augmented reality device, the like, or any combination of the aforementioned devices.

FIG. 1 shows an example data architecture of an example alert management system 100 within which embodiments of the present disclosure operate. In the depicted embodiment, as shown in at least FIG. 1, the alert management system 100 includes an event enrichment module 102, a feature extraction module 104, an alert clustering module 106, a bulk action assistant 108, an alert patterns module 110, an alert management module 112, an action/cluster recommendation module 114, a reranking module 116, and a learning to rank module 118. The depicted learning to rank module 118 is disposed in communication with a historical alert/cluster database (not shown).

The depicted alert management system 100 is configured to output data and instructions to one or more alert managers 120 that are sufficient to cause rendering of one or more of an alert cluster list interface, an alert cluster bulk action component, an alert cluster detail interface, or an alert cluster pattern interface. The depicted alert management system 100 is further configured to receive as inputs signals that represent user engagement with one or more of the alert cluster list interface, alert cluster bulk action component, alert cluster detail interface, or alert cluster pattern interface.

The alert management system 100 is configured to receive or intake one or more events 122 produced by a software application framework (e.g., a service-oriented platform). The events 122 are input into the event enrichment module 102. The event enrichment module 102 is configured to extract one or more alerts 124 from the events 122. The one or more alerts 124 may relate to and/or characterize the one or more events 122. The event enrichment module 102 is further configured to output alerts 124 to the feature extraction module 104, as well as to the alert managers 120. In one non-limiting example, an event may refer to some network, software application, or device condition (e.g., CPU utilization of greater than 80%) that triggers an alert that is sent to the event enrichment module 102 and to alert managers 120.

The depicted feature extraction module 104 is configured to receive the one or more alerts 124 and to output one or more alert features 126 of those one or more alerts 124 to an alert clustering module. That is, the feature extraction module is configured to extract one or more alert features 126 that characterize the one or more alerts 124. The feature extraction module 104 is further configured to send the one or more alert features 126 to the alert management module 112.

The depicted alert clustering module 106 is configured to receive the alert features 126 and to group any received alerts 124 based on the one or more alert features 126 using an alert clustering model. That is, alerts 124 that share similar alert features 126 are grouped together, in one embodiment, using a classification machine learning model, into alert clusters. The alert clustering module 106 is configured to assign and output cluster_IDs 128 to classified alerts of each alert cluster so that cluster identification may be persisted by downstream modules including, without limitation, the bulk action assistant 108 and the alert management module 112.

The depicted bulk action assistant 108 is configured to receive the alert clusters and associated cluster_IDs 128 and to identify common actions that may be executed in connection with each alert of the alert clusters. Such common actions are also referred to herein as "bulk actions". The depicted bulk action assistant 108 is configured to cause rendering of an alert cluster list interface to a user display of an alert manager 120. The depicted bulk action assistant 108 is further configured to cause rendering of an alert cluster bulk action component to the user display of an alert manager 120 in association with respective alert clusters presented in the alert cluster list interface.

The alert cluster bulk action component is triggered at the alert manager 120 based on recommended cluster actions 132 transmitted from the bulk action assistant 108. In the depicted example, the bulk action assistant 108 parses the received alert clusters and associated alert features, and then recommends bulk actions 132 that may be made available to an alert manager 120 via an alert cluster bulk action component. Example bulk actions 132 include, without limitation, snoozing a cluster of alerts during a set time (e.g., any time between Sunday midnight to Sunday at 2 AM), closing each alert of an alert cluster, acknowledging each alert of an alert cluster, escalating each alert of an alert cluster, or the like. In some embodiments, escalating each alert of an alert cluster may involve updating a priority status of each alert of the alert cluster. In other embodiments, escalating each alert of an alert cluster may involve triggering one or more escalation electronic communications to alert managers 120 associated with the alert cluster or each alert of the alert cluster.

The depicted alert patterns module 110 is configured to apply an alert patterns model to alerts and alert clusters to identify patterns, analytics, and predicted or recommended actions for such alert clusters based on such identified patterns or analytics. The depicted alert patterns module 110 is configured to output patterns, analytics, and/or recommended bulk actions to the bulk action assistant 108 for use by the bulk action assistant in generating recommended bulk actions 132. In some embodiments, the patterns, analytics, and recommend bulk actions may be used to support rendering of an alert cluster pattern interface and/or one or more alert cluster bulk action components.

The depicted alert management module 112 is configured to receive the alert features 126 and alert cluster rankings 150 produced by the bulk action assistant 108. The depicted alert management module 112 includes an action/cluster recommendation module 114 and a reranking module 116 that are each disposed in communication with the learning to rank module 118.

The alert features 126 and alert cluster rankings 150 are processed by the alert management module 112 to produce recommended alert actions 134 that are output to alert managers 120. Algorithms and models used by the action/cluster recommendation module 114 and the reranking module 116 are trained and updated based on control signals provided by the learning to rank module 118.

The depicted reranking module 116 is configured to receive alert feedback 136 from alert managers 120 and to rank alerts and alert clusters relative to other alerts and alert clusters based on such alert feedback 136. For example, alert clusters with greater urgency (based on alert features 126) may be ranked higher by the reranking module 116 than alert clusters with less urgency. Such ranking may be used in ordering the alert clusters listed in example alert cluster list interfaces as will be apparent to one of ordinary skill in the art in view of this disclosure.

Example Apparatuses for Alert Management Frameworks

Figure 2:
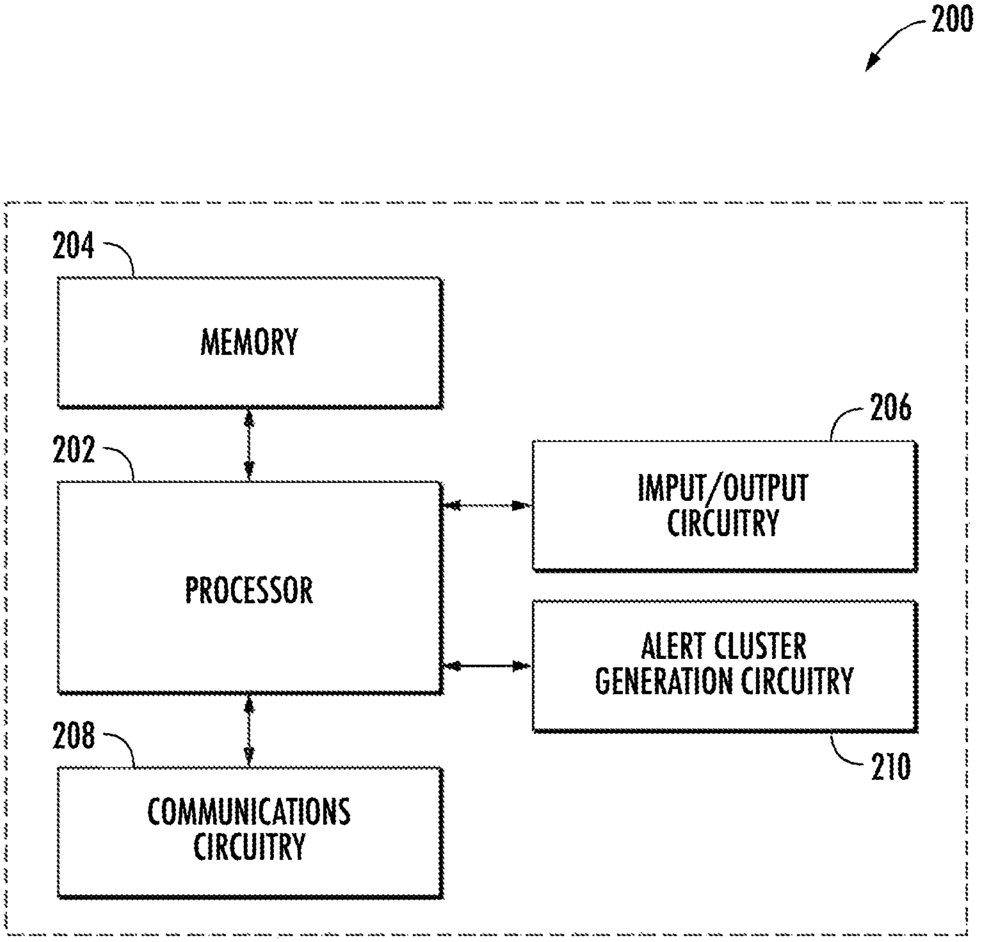
FIG. 2 is a schematic view of an example alert cluster generating apparatus configured to provide an alert management framework in accordance with various embodiments of the present disclosure.

Referring now to FIG. 2, in the depicted embodiment, the alert management system 100 is embodied as an alert cluster generation apparatus 200 shown in schematic format. The alert cluster generation apparatus 200 may be configured to execute operations enabled by one or more of the embodiments described in this disclosure.

According to various embodiments, the alert cluster generation apparatus 200 may be a computer, a user device, or any suitable configuration of hardware and/or software capable of executing operations enabled by the alert management system 100. In some embodiments, the alert cluster generation apparatus 200 includes a processor 202, a memory 204, input/output circuitry 206, communications circuitry 208, and alert cluster generation circuitry 210.

The components of the alert cluster generation apparatus 200 are described with respect to functional limitations. It should be understood that the particular implementations necessarily include the use of particular hardware. It should also be understood that certain of these components (processor 202, memory 204, input/output circuitry 206, communications circuitry 208, and/or alert cluster generation circuitry 210) may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) is in communication with the memory 204 via a bus for passing information among components of the apparatus. The memory 204 is non-transitory and includes, for example, one or more volatile and/or non-volatile memories. In other words, for example, the memory 204 is an electronic storage device (e.g., a computer-readable storage medium). The memory 204 is configured to store information, data, content, applications, instructions, or the like for enabling the apparatus to carry out various functions in accordance with example embodiments of the present invention.

The processor 202 is embodied in a number of different ways and may, for example, include one or more processing devices configured to perform independently. In some preferred and non-limiting embodiments, the processor 202 includes one or more processors configured in tandem via a bus to enable independent execution of instructions, pipelining, and/or multithreading. The use of the term "processing circuitry" is understood to include a single core processor, a multi-core processor, multiple processors internal to the apparatus, and/or remote or "cloud" processors.

In some preferred and non-limiting embodiments, the processor 202 is configured to execute instructions stored in the memory 204 or otherwise accessible to the processor 202. In some preferred and non-limiting embodiments, the processor 202 is configured to execute hard-coded functionalities. As such, whether configured by hardware or software methods, or by a combination thereof, the processor 202 represents an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed. In some embodiments, the memory 204 may be a non-transitory memory including program code that is configured to cause the alert cluster generation apparatus 200 to provide various functionality associated with the event enrichment module, the feature extraction module, the alert clustering module, the bulk action assistant, the alert patterns module, the learning to rank module, the alert management module including, without limitation, those functionalities attributed to the alert/cluster recommendation module, and/or the reranking module.

In some embodiments, the alert cluster generation apparatus 200 includes input/output circuitry 206 that is, in turn, be in communication with processor 202 to provide output to the user and, in some embodiments, to receive an indication of a user input. The input/output circuitry 206 comprises hardware and software that is configured to render a user interface (e.g., an alert cluster list interface, an alert cluster bulk action component, an alert detail interface, an alert cluster pattern interface, etc.) and includes a display (e.g., a user display of an alert manager). The input/output circuitry further includes a web user interface, a mobile application, a query-initiating computing device, a kiosk, or the like.

In some embodiments, the input/output circuitry 206 also includes a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 is any means such as a device or circuitry embodied in either hardware or a combination of hardware and software that is configured to receive and/or transmit data from/to a network and/or any other device, circuitry, or module in communication with the alert cluster generation apparatus 200. In this regard, the communications circuitry 208 includes, for example, a network interface for enabling communications with a wired or wireless communication network. For example, the communications circuitry 208 includes one or more network interface cards, antennae, buses, switches, routers, modems, and supporting hardware and/or software, or any other device suitable for enabling communications via a network. Additionally or alternatively, the communications circuitry 208 includes the circuitry for interacting with the antenna/antennae to cause transmission of signals via the antenna/antennae or to handle receipt of signals received via the antenna/antennae.

The alert cluster generation circuitry 210 comprises a device or circuitry embodied in either hardware or a combination of hardware and software that is configured to provide alert management associated with one or more software application frameworks, enabling enterprise organizations to create and manage alerts efficiently in a manner that mitigates alert overload. For example, the alert cluster generation circuitry 210 may include specialized circuitry that are configured to perform the functions of one or more of with the event enrichment module, the feature extraction module, the alert clustering module, the bulk action assistant, the alert patterns module, the learning to rank module, the alert management module including, without limitation, those functionalities attributed to the alert/cluster recommendation module, and/or the reranking module.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Example Interfaces

Figure 3A:
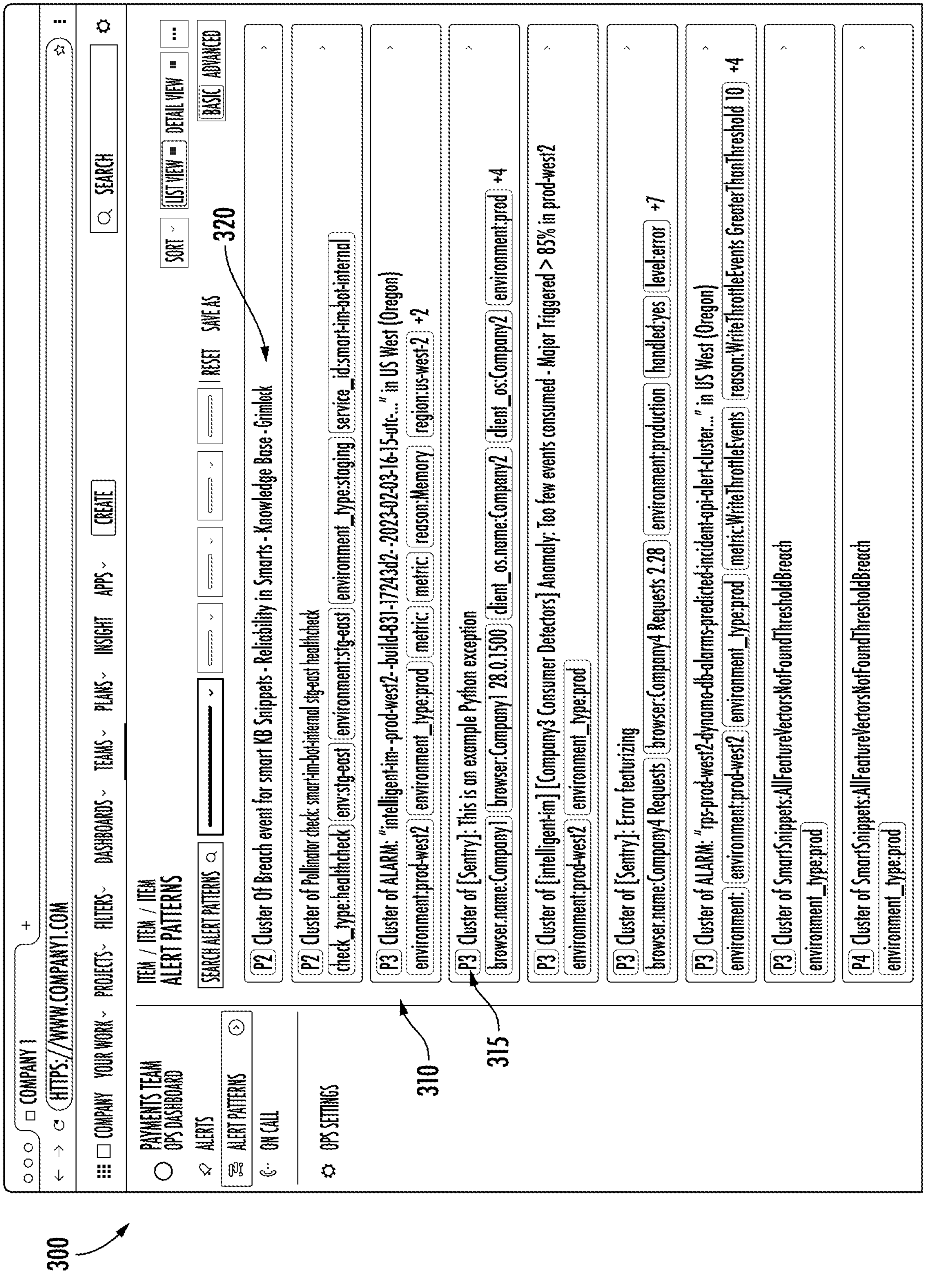
FIG. 3A depicts an example alert cluster list interface configured in accordance with various embodiments of the present disclosure.

FIG. 3A depicts an example alert cluster list interface 300 configured in accordance with various embodiments of the present disclosure. The depicted alert cluster list interface comprises an alert cluster list component 310 that visually depicts alert clusters 320 identified by the alert management system. Each alert cluster 320 listed in the alert cluster list component 310 includes an alert cluster engagement component 315 that is configured to, when engaged by a user, cause rendering of an alert cluster detail interface such as that depicted in FIG. 3C. In the depicted embodiment, the alert cluster engagement component 315 is a button having an embedded URL link that is associated with an alert cluster identifier component (e.g., cluster identifier P3). The embedded URL link causes rendering of the alert cluster detail interface associated with alert cluster P3.

Figure 3B:
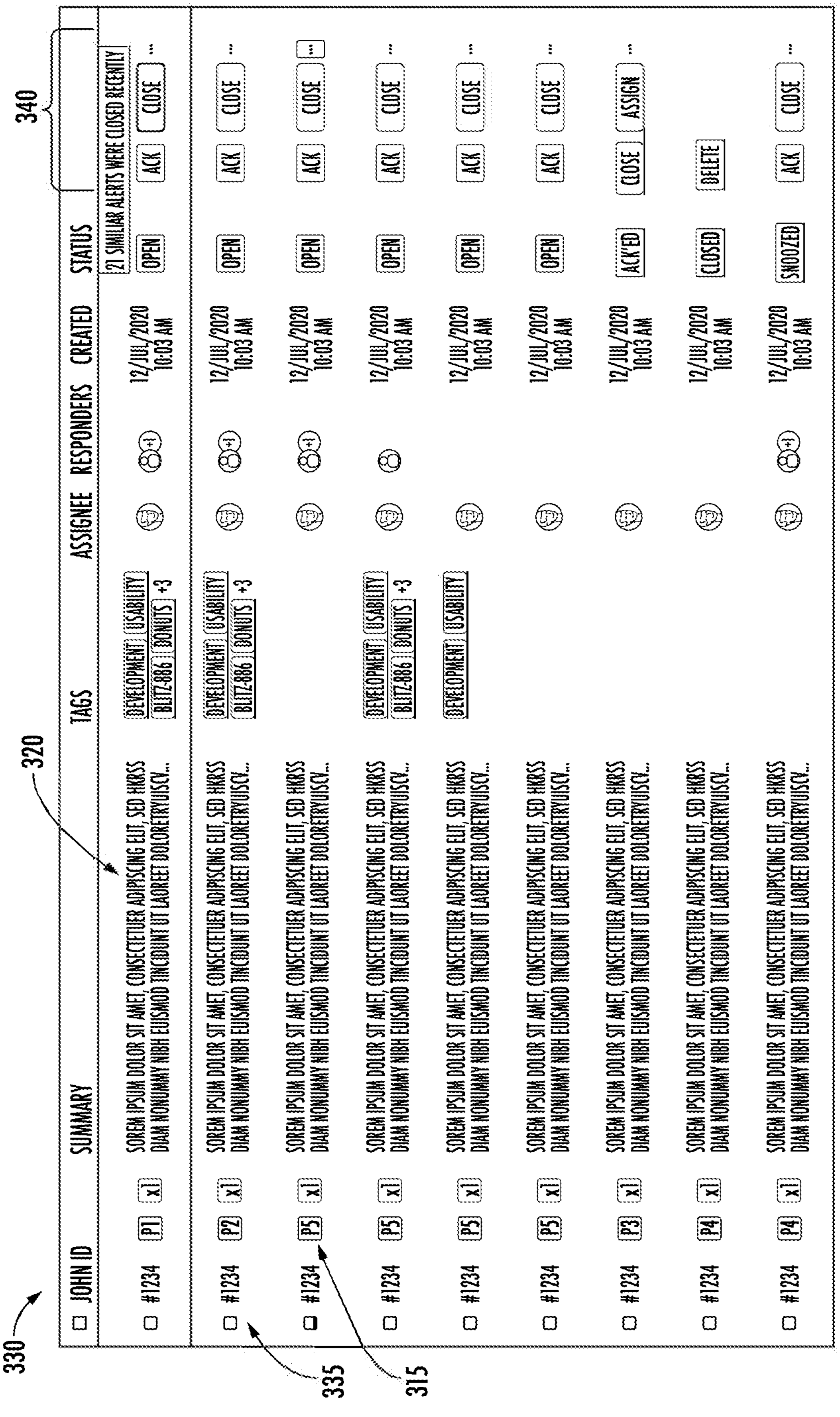
FIG. 3B depicts an example alert cluster list interface having an alert cluster bulk action component configured in accordance with various embodiments of the present disclosure.

FIG. 3B depicts an example alert cluster list interface 330 having an alert cluster bulk action component 340 configured in accordance with various embodiments of the present disclosure. The depicted alert cluster list interface 330 comprises an alert cluster list component 335 that visually depicts alert clusters 320 identified by the alert management system. Each alert cluster 320 listed in the alert cluster list component 335 includes an alert cluster engagement component 315 that is configured to, when engaged by a user, cause rendering of an alert cluster detail interface such as that depicted in FIG. 3C.

The depicted alert cluster bulk action component 340 is configured, when engaged by a user, to cause common action to be taken by the alert management system with respect to each alert of a selected alert cluster. For example, in the depicted embodiment, the alert cluster bulk action component 340 is configured to cause closing of all alerts associated with a selected alert cluster (e.g., alert cluster P1) through simple selection of the "close" interface button that is shown in association with the example alert cluster bulk action component 340.

Figure 3C:
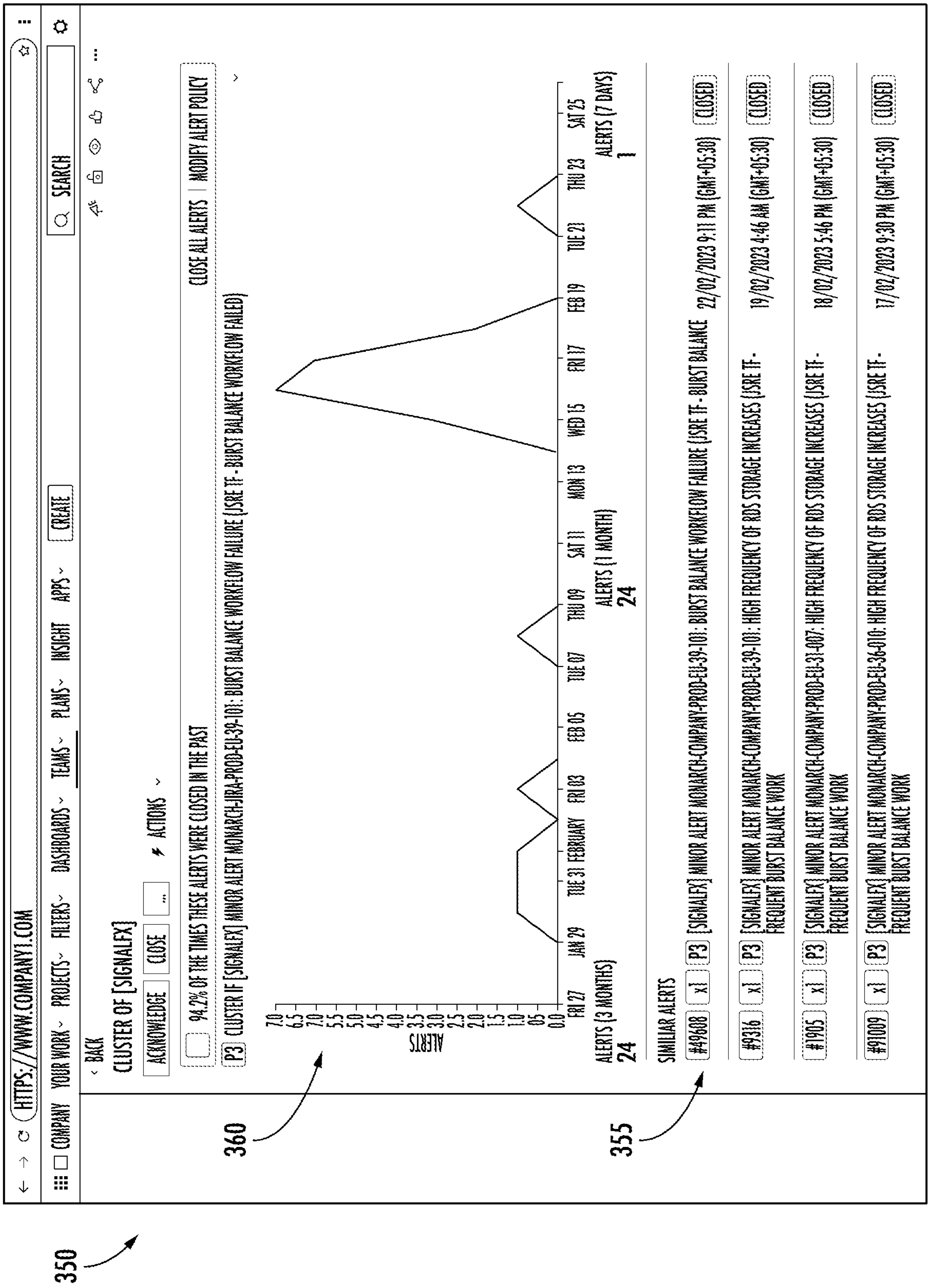
FIG. 3C depicts an example alert cluster detail interface having an alert cluster pattern interface component configured in accordance with various embodiments of the present disclosure.

FIG. 3C depicts an example alert cluster detail interface 350 having an alert cluster pattern interface component 360 configured in accordance with various embodiments of the present disclosure. The depicted alert cluster pattern interface component 360 is configured to visually depict patterns, trends, or analytics associated with a selected alert cluster. In the depicted embodiment, the pattern interface component includes a line graph displaying alert frequency per unit time. The depicted alert cluster detail interface 350 further includes an alert list component 355 that lists alerts of the selected alert cluster. For example, in the depicted embodiment, the alert list component 355 includes all alerts that were classified by the alert management system as part of the alert cluster designated as P3.

Example Methods of Use

Figure 4:
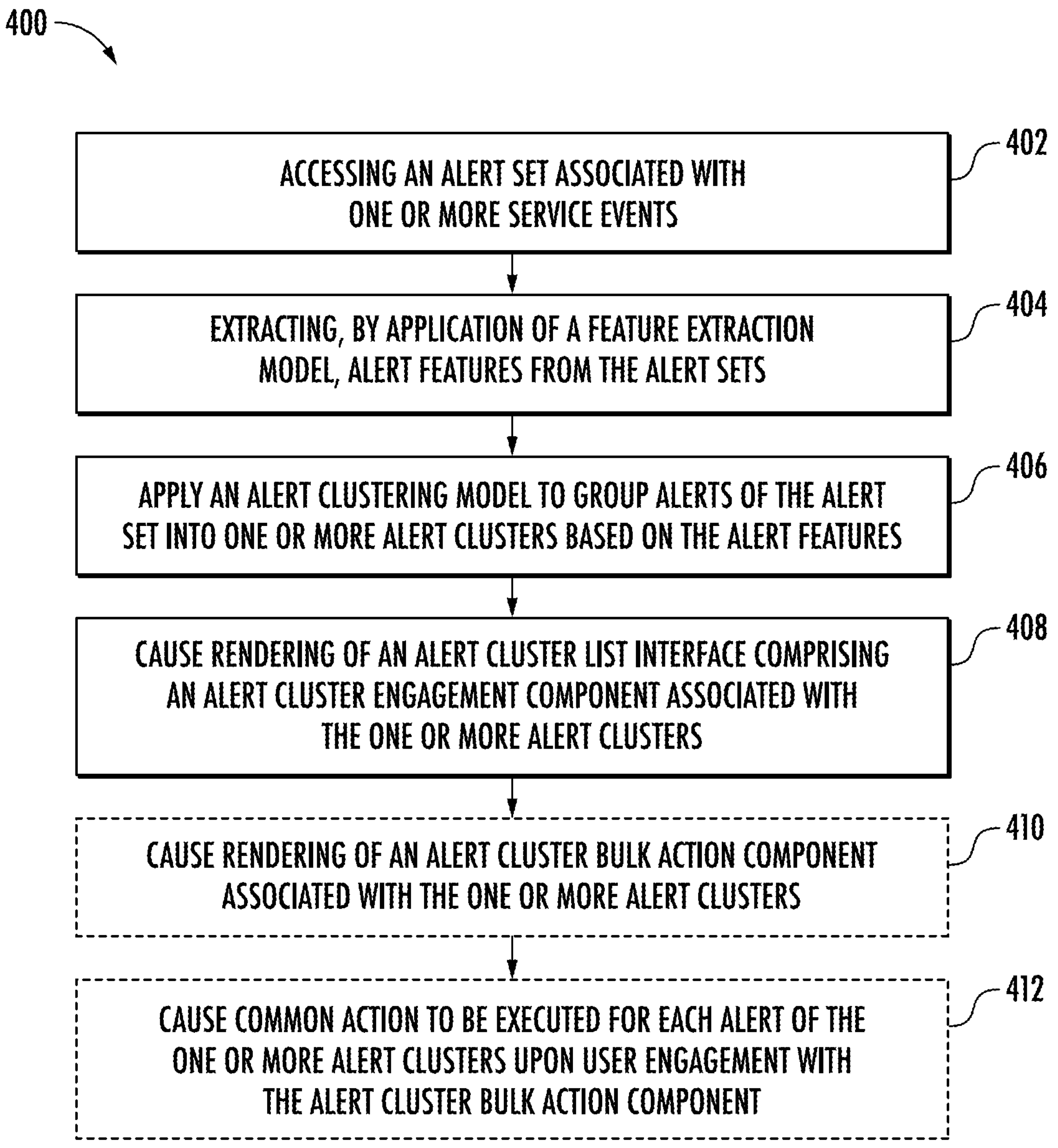
FIG. 4 shows a flow chart illustrating an example method of causing rendering of an alert cluster list interface in accordance with various embodiments of the present disclosure.

FIG. 4 shows an example flow chart illustrating an example method 400 of causing rendering of an alert cluster list interface in accordance with various embodiments of the invention. In some embodiments, the depicted method 400 may be a computer-implemented method for execution by an alert cluster generating apparatus 200 (shown in FIG. 2) of an alert management system 100 (shown in FIG. 1). It will be understood that the depicted method 400 may be implemented using any suitable system, apparatus, and their various components.

In the depicted embodiment, the method 400 includes a step 402 of accessing an alert set associated with one or more service events. In various embodiments, the alert set is generated by an event enrichment module that is configured to receive an event stream from a software application framework. Events may include various service requests or notifications, including burst balance workflow failures, RDS storage increases, and/or frequent burst balance work.

The depicted method 400 further includes a step 404 of extracting, by a feature extraction model, alert features from the accessed alert sets. Alert features may include alert related text, alert related data, alert related metadata, feature or vector embeddings, and other data objects that are configured for input to a machine learning model (e.g., an alert clustering model) or machine learning training corpus. In some embodiments, the alert features may define alert location, alert severity, alert time, alert related service or microservice, alert service dependencies, and the like.

The depicted method 400 includes a step 406 of applying an alert clustering model to group alerts of the alert set into one or more alert clusters based on the extracted alert features. Each alert that has been assigned to an alert cluster is programmatically associated with a cluster_ID so that individual alert clusters can be persisted by downstream services or systems.

The method 400 includes a step 408 of causing rendering of an alert cluster list interface to a user device display (e.g., a user display of a device manager). The rendered alert cluster list interface comprises an alert cluster engagement component associated with at least one of the one or more alert clusters identified at step 406.

The depicted method 400 further includes step 410 of causing rendering of an alert cluster bulk action component associated with at least one of the one or more alert clusters identified at step 406. Step 410 is optional and thereby is shown schematically in dashed lines in FIG. 4.

The depicted method 400 further includes step 412 of causing common action to be executed for each alert of the one or more alert clusters in response to user engagement with the alert cluster bulk action component. Step 412 is also optional and thereby is shown schematically in dashed lines in FIG. 4.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An alert cluster generation apparatus comprising one or more processors and one or more memories storing instructions that are operable, when executed by the one or more processors, to cause the alert cluster generation apparatus to:

access an alert set associated with one or more service events;

apply a feature extraction model that is configured to extract alert features from the alert set, wherein the alert features comprise at least an alert feature vector transformation and one or more historical response actions;

apply an alert clustering model to group alerts of the alert set into one or more alert clusters based at least in part on the alert feature vector transformations and the one or more historical response actions;

cause rendering of an alert cluster list interface to a user device display, wherein the alert cluster list interface comprises an alert cluster engagement component associated with at least one of the one or more alert clusters; and cause common action to each alert of the one or more alert clusters in response to user engagement with the alert cluster engagement component.

2. The alert cluster generation apparatus of claim 1, wherein the alert cluster list interface comprises an alert cluster bulk action component associated with at least one of the one or more alert clusters.

3. The alert cluster generation apparatus of claim 2, wherein the one or more processors and one or more memories storing instructions are further operable, when executed by the one or more processors, to cause the alert cluster generation apparatus to:

cause rendering of the alert cluster bulk action component to the user device display in association with the one or more alert clusters.

4. The alert cluster generation apparatus of claim 2, wherein the one or more processors and one or more memories storing instructions are further operable, when executed by the one or more processors, to cause the alert cluster generation apparatus to:

generate one or more recommended actions based on at least one of the one or more alert clusters; and cause, based on the one or more recommended actions, the common action to each alert of the one or more alert clusters in response to user engagement with the alert cluster bulk action component.

5. The alert cluster generation apparatus of claim 1, wherein the one or more processors and one or more memories storing instructions are further operable, when executed by the one or more processors, to cause the alert cluster generation apparatus to:

cause rendering of an alert cluster detail interface associated with the at least one of the one or more alert clusters upon receiving a user engagement indication associated the alert cluster engagement component.

6. The alert cluster generation apparatus of claim 5, wherein the alert cluster detail interface comprises an alert cluster pattern interface component that is configured to visually depict alert analytics associated with the at least one of the one or more alert clusters.

7. The alert cluster generation apparatus of claim 1, wherein the one or more processors and one or more memories storing instructions are further operable, when executed by the one or more processors, to cause the alert cluster generation apparatus to:

rank alerts of the alert set into a ranked sequence based at least in part on the alert features.

8. The alert cluster generation apparatus of claim 7, wherein the one or more processors and one or more memories storing instructions are further operable, when executed by the one or more processors, to cause the alert cluster generation apparatus to:

rank alerts of the alert set into an updated ranked sequence based at least in part on the one or more alert features and alert feedback received from an alert manager device.

9. A computer-implemented method comprising:

accessing an alert set associated with one or more service events;

applying a feature extraction model that is configured to extract alert features from the alert set, wherein the alert features comprise at least an alert feature vector transformation and one or more historical response actions;

applying an alert clustering model to group alerts of the alert set into one or more alert clusters based at least in part on the alert feature vector transformations and the one or more historical response actions;

causing rendering of an alert cluster list interface to a user device display, wherein the alert cluster list interface comprises an alert cluster engagement component associated with at least one of the one or more alert clusters; and causing common action to each alert of the one or more alert clusters in response to user engagement with the alert cluster engagement component.

10. The computer-implemented method of claim 9, wherein the alert cluster list interface comprises an alert cluster bulk action component associated with at least one of the one or more alert clusters.

11. The computer-implemented method of claim 10, further comprising:

causing rendering of the alert cluster bulk action component to the user device display in association with the one or more alert clusters.

12. The computer-implemented method of claim 11, further comprising:

generating one or more recommended actions based on at least one of the one or more alert clusters; and causing, based on the one or more recommended actions, common action to each alert of the one or more alert clusters in response to user engagement with the alert cluster bulk action component.

13. The computer-implemented method of claim 9, further comprising:

causing rendering of an alert cluster detail interface associated with the at least one of the one or more alert clusters upon receiving a user engagement indication associated the alert cluster engagement component.

14. The computer-implemented method of claim 13, wherein the alert cluster detail interface comprises an alert cluster pattern interface component that is configured to visually depict alert analytics associated with the at least one of the one or more alert clusters.

15. The computer-implemented method of claim 9, further comprising:

ranking alerts of the alert set into a ranked sequence based at least in part on the alert features.

16. The computer-implemented method of claim 15, further comprising:

ranking alerts of the alert set into an updated ranked sequence based at least in part on the one or more alert features and alert feedback received from an alert manager device.

17. A computer program product, stored on a non-transitory computer readable medium, comprising instructions that when executed by one or more computers cause the one or more computers to:

access an alert set associated with one or more service events;

apply a feature extraction model that is configured to extract alert features from the alert set, wherein the alert features comprise at least an alert feature vector transformation and one or more historical response actions;

apply an alert clustering model to group alerts of the alert set into one or more alert clusters based at least in part on the alert feature vector transformations and the one or more historical response actions;

cause rendering of an alert cluster list interface to a user device display, wherein the alert cluster list interface comprises an alert cluster engagement component associated with at least one of the one or more alert clusters; and cause common action to each alert of the one or more alert clusters in response to user engagement with the alert cluster engagement component.

18. The computer program product of claim 17, wherein the alert cluster list interface comprises an alert cluster bulk action component associated with at least one of the one or more alert clusters.

19. The computer program product of claim 18, wherein the instructions that when executed by one or more computers further cause the one or more computers to:

cause rendering of the alert cluster bulk action component to the user device display in association with the one or more alert clusters.

20. The computer program product of claim 19, wherein the instructions that when executed by one or more computers further cause the one or more computers to:

generate one or more recommended actions based on at least one of the one or more alert clusters; and cause, based on the one or more recommended actions, common action to each alert of the one or more alert clusters in response to user engagement with the alert cluster bulk action component.

* * * * *